United States Patent
Chan et al.

(10) Patent No.: US 8,386,389 B2
(45) Date of Patent: Feb. 26, 2013

(54) SERVICE DELIVERY SYSTEMS AND METHODS

(75) Inventors: Wesley Chan, Palo Alto, CA (US); Ruth Rosenberg, Lafayette, CA (US); Venkatesh Gururaja Rao, Cupertino, CA (US); Glenn Clifford Steiner, Los Altos, CA (US); James E. Patterson, Ft. Collins, CO (US); Philippe Debaty, Mountain View, CA (US); Shane Konsalla, Stare, ID (US); Grady Gordon Cooper, Boise, ID (US); Megan Grey Taylor, San Francisco, CA (US); Staci Hartman, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4327 days.

(21) Appl. No.: 10/135,720

(22) Filed: Apr. 30, 2002

(65) Prior Publication Data

US 2004/0203638 A1   Oct. 14, 2004

(51) Int. Cl.
*G06F 21/00* (2006.01)

(52) U.S. Cl. ........... 705/52; 705/50; 705/51; 705/53; 705/54; 705/55; 705/56; 705/57; 705/58; 705/59; 713/150; 713/155; 713/165; 370/400; 370/401; 370/474; 370/452; 370/450; 370/392; 370/403; 709/245; 709/227

(58) Field of Classification Search ............... 705/51–59
See application file for complete search history.

(56) References Cited

U.S. PATENT DOCUMENTS

| | | | |
|---|---|---|---|
| 5,363,425 A | 11/1994 | Mufti et al. | |
| 5,835,861 A | 11/1998 | Whiteside | |
| 6,385,729 B1 * | 5/2002 | DiGiorgio et al. | 726/9 |
| 6,748,471 B1 * | 6/2004 | Keeney et al. | 710/220 |
| 2001/0021950 A1 | 9/2001 | Hawley et al. | |
| 2002/0013129 A1 | 1/2002 | Davies | |
| 2002/0035474 A1 | 3/2002 | Alpdemir | |
| 2002/0035560 A1 | 3/2002 | Sone | |
| 2003/0093670 A1 * | 5/2003 | Matsubayashi et al. | 713/168 |

OTHER PUBLICATIONS

Cooltown Developer's Network, "People, Places, Things: Web Presence for the Real World," <http://www.cooltown.hp.com/dev/wpapers/WebPres/WebPresence.asp> (before Jun. 8, 2001).

* cited by examiner

*Primary Examiner* — Calvin Loyd Hewitt, II
*Assistant Examiner* — Christina Owen Sherr (57) ABSTRACT

Service delivery systems and methods are described. In one aspect, a service delivery system includes a set of tokens, a database, multiple terminals, and a service manager. Each of the tokens includes a respective token identifier. The database stores personal user profiles each of which is associated with a respective token identifier. The terminals are distributed about a selected locale. Each terminal has a reader that is operable to read token identifiers from tokens and a controller that is operable to transmit read token identifiers and context data identifying one or more conditions under which a token identifier is read through a network connection each time a token identifier is read. The service manager is connected to each of the terminals through a respective network connection and to the database. The service manager is operable to invoke one or more services in response to receipt of a token identifier from a transmitting terminal to collect data selected based at least in part upon context data received from the transmitting terminal.

36 Claims, 4 Drawing Sheets

SERVICE DELIVERY SYSTEMS AND METHODS

CROSS-REFERENCE TO RELATED APPLICATIONS

This application relates to co-pending U.S. patent application Ser. No. 10/133,119, filed on Apr. 26, 2002, by Wesley Chan et al., and entitled "Service Delivery Terminal and Method," which is incorporated herein by reference.

TECHNICAL FIELD

This invention relates to service delivery systems and methods.

BACKGROUND

Various communication networks exist for enabling distributed devices to communicate and pass information between one another. Networks usually are classified based upon three properties: topology, protocol, and architecture. The topology of a network specifies the geometric arrangement of the network. Common topologies are a bus, ring, and star. The protocol specifies a common set of rules and signals the devices on the network use to communicate. The architecture of a network refers to the network design. There are two major types of network architecture: peer-to-peer and client-server. In a peer-to-peer networking configuration, there is no central server, and devices simply connect with each other in a workgroup to share files, printers, and Internet access. In a client-server architecture, there usually is a central server, with which all of the devices register. The central server usually provides a variety of services, including centrally routed Internet access, e-mail, file sharing, and printer access, as well as ensuring security across the network. A network architecture also may be characterized as being open (i.e., the specifications are available to the public) or closed (i.e., the specifications are proprietary).

Recently, efforts to deliver data to distributed devices have focused on providing personalized and localized services. For example, context aware mobile telephones have been developed to access data through low power, short range base stations in places, such as shopping malls to provide location-specific information, such as local maps and information about nearby shops and restaurants. A context aware mobile telephone may be configured to filter the information received from base stations according to pre-stored user preferences so that the user will be alerted only if an item of data of particular interest has been received.

U.S. Pat. No. 5,835,861 describes a wireless telephone system in which a wireless telephone may retrieve the telephone number of a vendor by transmitting a prompt signal to an active advertisement source, which in turn transmits a response signal containing the telephone number of the corresponding advertising vendor. The retrieved telephone number may be used to place a call to that vendor automatically. The telephone number also may be stored for later use. The signals between the advertisement source and the wireless telephone may be transmitted as modulated infrared (IR) signals.

Hewlett-Packard Company has proposed a "Cooltown" project in which systems that are location-aware may be created using URL's for addressing, physical URL's for delivery via beacons and sensing of URL's for discovery, and localized web servers for directories. The systems are ubiquitous so that nomadic users may be supported. On top of this infrastructure, Internet connectivity may be leveraged to support communications services. Web presence bridges the World Wide Web and the physical world inhabited by the users, providing a model for supporting nomadic users without a central control point. In one implementation, a cooltown museum and Bookstore offers visitors a Web-enhanced experience. As visitors tour the museum, their portable digital assistant (PDA) may receive Web URLs from a set of distributed wireless beacons. These beacons are small infrared transceivers that may be located near pictures, sculptures, and other items of interest. Each beacon is configured to transmit signals containing the URL for a Web page containing information relating to the item associated with the beacon. In this scheme, a user may use a PDA's Web browser to read or hear information about the item of interest, such as information about an artist or a work and information about related art works in the cooltown museum. URLs also may be stored as bookmarks for further study or they may be used to select reproductions of the artwork from the museum's online store.

In one approach to providing a personalized interaction with a computer network, U.S. Patent Publication No. 2001/0021950 describes a network access control scheme in which interaction with a computer network is facilitated or restricted based on a portable tangible token that may be carried by a user. The token includes a machine-readable indication (or tag) that identifies the token and may be read wirelessly by a tag reader associated with a computer. The tag reader communicates the identifier to a computer connected to the network as a node. The computer, in response, determines and implements a network-access criterion based on the token. Generally, the computer maintains a database relating token identifiers to associated network-access criteria, and consults the database when presented with an identifier. The access criterion specifies information governing interaction between the computer and the network, and can serve to initiate connections or restrict them.

SUMMARY

In one aspect, the invention features a service delivery system, comprising a set of tokens, a database, multiple terminals, and a service manager. Each of the tokens comprises a respective token identifier. The database stores personal user profiles each of which is associated with a respective token identifier. The terminals are distributed about a selected locale. Each terminal has a reader that is operable to read token identifiers from tokens and a controller that is operable to transmit read token identifiers and context data identifying one or more conditions under which a token identifier is read through a network connection each time a token identifier is read. The service manager is connected to each of the terminals through a respective network connection and to the database. The service manager is operable to invoke one or more services in response to receipt of a token identifier from a transmitting terminal to collect data selected based at least in part upon context data received from the transmitting terminal.

In another aspect, the invention features a service delivery method in accordance with which tokens each comprising a respective token identifier are issued to users. Personal user profiles each associated with a respective token identifier are stored. Token identifiers and context data identifying one or more conditions under which each token identifier is read are received from multiple terminals distributed about a selected locale through multiple corresponding network connections. One or more services are invoked in response to receipt of a token identifier from a transmitting terminal to collect data selected based at least in part upon context data received from the transmitting terminal.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
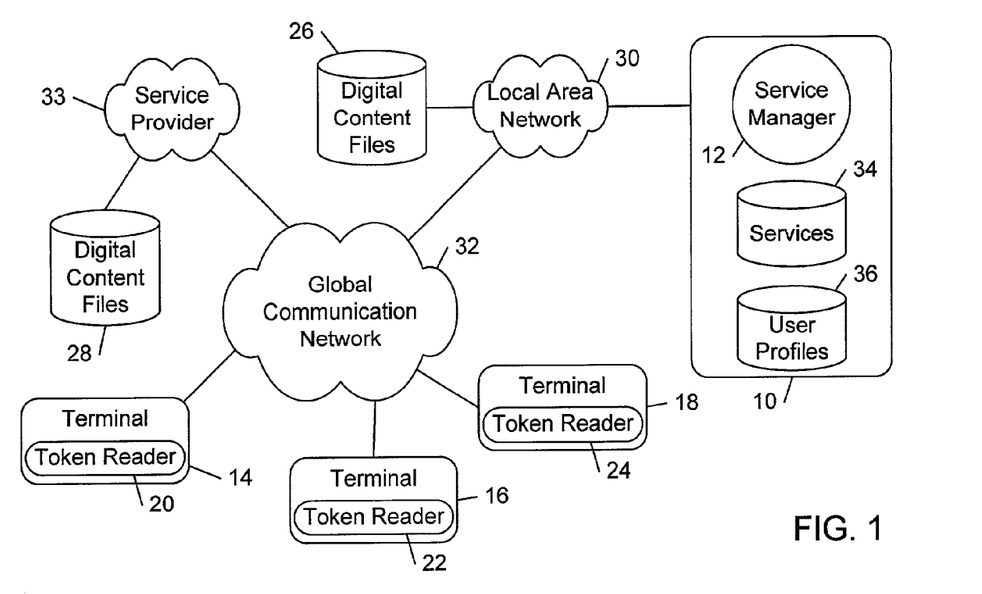
FIG. 1 is a diagrammatic view of a system for delivering data.

Referring to FIG. 1, in one embodiment, a service management node 10 includes a service manager 12 that is configured to enable data to be quickly and easily collected by selectively activating one or more terminals 14, 16, 18 that are distributed about a selected locale. Terminals 14-18 transmit to service manager 12 token identifiers that are read by respective token readers 20, 22, 24 and context data identifying one or more conditions under which each token identifier is read. As explained in detail below, service manager 12 collects data that is selected based at least in part upon the context data that is received from a transmitting terminal 14-18. As used herein, the term "data" refers broadly to any form of digital content, including text, audio, graphics, animated graphics and full-motion video. This content may be packaged and presented individually or in some combination in a wide variety of different forms, including documents, annotations, presentations, music, still photographs, videos, and meta data describing one or more associated digital content files. The data may be stored physically in a local database of service management node 10 or in one or more remote databases 26, 28 that may be accessed over a local area network 30 and a global communication network 32, respectively. Some data also may be stored in one or more remote databases (not shown) that are accessible over respective peer-to-peer network connections.

In some embodiments, digital content may be compressed using a compression format that is selected based upon digital content type (e.g., an MP3 or a WMA compression format for audio works, and an MPEG or a motion JPEG compression format for audio/video works). The digital content may be formatted in accordance with an appropriate transmission format. For example, digital content may be transmitted in a format that is suitable for rendering by a computer, a wireless device, a voice device, a printer, or other output device. In addition, the requested digital content may be transmitted as a complete file or in a streaming file format. Transmissions between service manager 12, terminals 14-18, and any service providers 33 may be conducted in accordance with one or more conventional secure transmission protocols. For example, each digital content transmission may involve packaging the digital content and any associated meta-data into an encrypted transfer file that may be transmitted securely from one entity to another.

Global communication network 32 may include a number of different computing platforms and transport facilities, including a voice network, a wireless network, and a computer network. Data may be transmitted and presented in a number of different media formats, such as voice, Internet, e-mail and wireless formats. In this way, users may access the services 34 provided by service management node 10 by interacting with terminals 14-18 that may be implemented in the form of any of a wide variety of different communication devices. For example, in one illustrative implementation, a wireless device terminal (e.g., a wireless personal digital assistant (PDA) or a cellular telephone) may connect to service management node 10 over a wireless network. Communications from the wireless device terminal may be in accordance with the Wireless Application Protocol (WAP). A wireless gateway converts the WAP communications into HTTP messages that may be processed by service provider 10. In another illustrative implementation, a software program operating at a client personal computer (PC) terminal or a networked printer terminal may access the services of service management node 10 over the Internet.

In some implementations, each user token includes an RFID (radio frequency identification) tag and each terminal reader 20-24 is operable to read token identifiers wirelessly from token RFID tags. As used herein, the term RFID tag refers broadly to any system that uses a wirelessly readable signature or code that is embedded into a small package (e.g., a chip) that may be incorporated into a token (e.g., a badge, a keychain, or other portable item or article). In some embodiments, RFID tags are implemented as conventional small, low-powered microchips with an integrated antenna. In these embodiments, each token reader 20-24 transmits an excitation signal, which powers the microchip and thereby causes the microchip to transmit a unique token identifier back to the reader. In some embodiments, tokens may be coupled to readers magnetically or electrically. In other embodiments, RFID microchips may transmit signals to readers 20-24.

In other implementations, the tokens and token readers may be based upon other kinds of identification technologies, including biometric-based identification systems, radio or infrared beacon-based systems, and bar code or other machine-decipherable indicia-based systems.

As explained in detail below, in some implementations, the system and architecture of FIG. 1 enables personalized, contextual electronic service and content to be delivered to attendees of conferences, conventions, tradeshows, and other venues, such as airport terminals. The system creates a personal online profile 36 for each user and additionally allows users to update their state and services listing as they move from one location (or client terminal) to another. In this way, users are linked to their personal online profile—a "web presence"—by means of the unique identifiers that are contained in the tokens that are issued to the users.

In these implementations, the service delivery system enables users to identify themselves automatically by presenting their tokens to token readers 20 24. In some implementations, each terminal is dedicated to provide access to a respective service or set of services so that when a user presents a token to a reader at a particular terminal, that user is effectively declaring an interest in interacting with the service or set of services to which the terminal is dedicated. Each terminal is configured to transmit to service manager 12 read token identifiers and context data identifying one or more conditions user which each token identifier is read. The context data may include one or more of an identifier assigned to a terminal, an indication of a time when a token identifier is read, and an indication of where a terminal is located within the selected locale. The context data may be generated by one or more context data generators (e.g., a GPS receiver, a clock, a thermometer, an accelerometer, or an electronic compass) that are integrated within each terminal 14-18. Context data also may be retrieved from service manager 12 over a network connection. In this way, a convention attendee who desires to add a set of conference notes to his or her digital library, for example, may simply present his or her token to a digital library terminal that is configured to provide a digital library service. This method of declaring interest in a particular service is simple, scalable, and easy for users to understand.

Such implementations of the system of FIG. 1 allow content and information to be delivered and updated in a contextual and personalized way. The data is personalized because it is suited for an individual user, as opposed to all users. For example, in tradeshow and conference applications, a user may access a conference schedule, e-mail messages addressed to the user and sent by other attendees, or a customized digital library of product brochures and conference proceedings. The data is contextual because it is selected based upon a certain context or set of parameters (e.g., one or more of a terminal identifier, a terminal location, or a time when a token is presented). Examples include a service that prints out a set of presentation notes on a printer-based client terminal when a user is located in or near the presentation room, and a service that reports the location where the next event to which a user has registered will take place.

Figure 2:
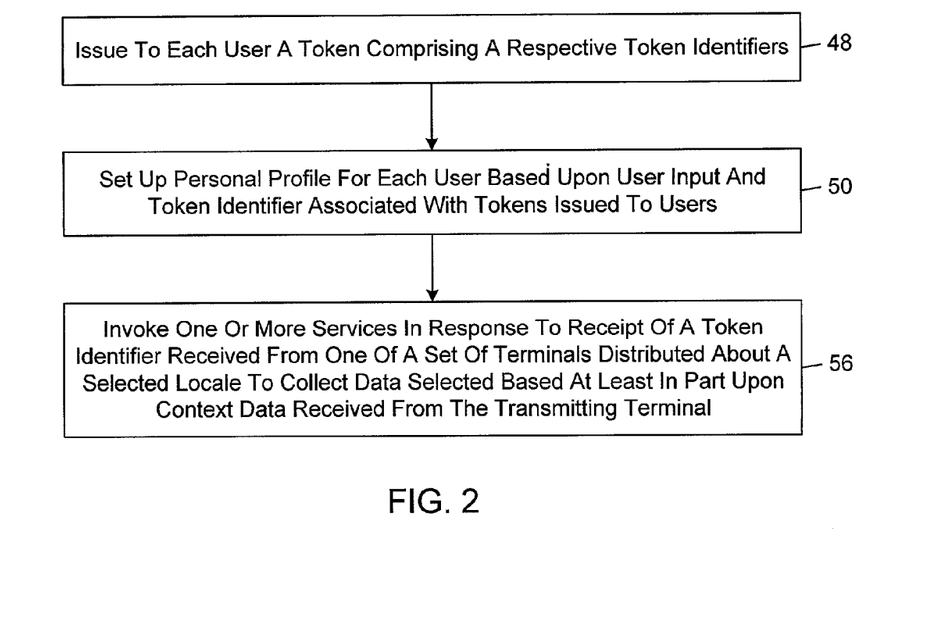
FIG. 2 is a flow diagram of a method of delivering data.
Figure 3:
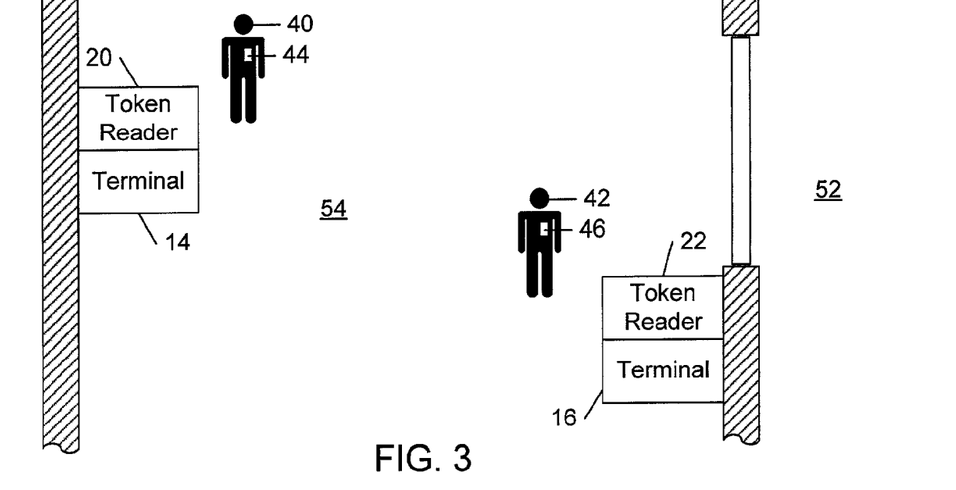
FIG. 3 is a diagrammatic view of users collecting personalized data by presenting tokens to terminals that communicate with a service manager through respective network connections.

Referring to FIGS. 2 and 3, in one embodiment, the service delivery system of FIG. 1 may operate as follows. Each participating user 40, 42 is issued a respective token 44, 46 that includes a unique identifier (step 48). A personal profile 36 (FIG. 1) also is set up for each participating user 40, 42 (step 50). Users 40, 42 may be issued tokens 44, 46 before or after personal profiles are set up. Each personal profile is linked to a respective token by the token identifier that is embedded in the token. A personal user profile may contain a list of services 34 to which the user is subscribed and information that is needed to access or personalize the data collected by these services. For example, if a user is subscribed to an e-mail message service, the personal profile should contain the user's e-mail address and the URL (uniform resource locator) of the corresponding e-mail server. After tokens 44, 46 have been issued and personal profiles 34 have been set up, users 40, 42 may move about a selected locale (e.g., a building hosting one or more of a tradeshow, a convention or a conference, or an airport terminal or a hotel) and collect desired data as needed by presenting their tokens 44, 46 to one or more token readers. As shown in FIG. 3, a digital library terminal 20 may be located near a room 52 in which a presentation or lecture is being given, whereas a schedule terminal 22 may be located along a walkway 54 of the selected locale. In response to receipt of a token identifier from one of terminals 20-24, service manager 12 is operable to invoke one or more services 34 to collect data selected based at least in part upon context data received from the transmitting terminal (step 56). The collected data may be stored in a digital file that is linked to the user personal profile associated with the received token identifier or the data may be sent to the transmitting terminal for delivery to the user who presented the corresponding token, or both.

The following is a catalogue of exemplary services that may be invoked by service manager 12.

Digital Library Service

A digital library service may be invocable to add an identified digital content file to a digital content store associated with a token identifier transmitted with context data identifying the digital content file. The digital content store provides a central electronic repository for all information to which a user has expressed an interest by presenting his or her issued token. The context data may be an identifier assigned to a digital library terminal, an indication of where a digital library terminal is located within the selected locale, or an indication of a time when a token identifier is read. The digital content file may be identified simply based on the digital library terminal identifier. Alternatively, the digital content file may be identified based upon the location context data or the time context data, or both. For example, the digital library terminal may be located near the place where an event (e.g., a lecture or presentation) is occurring and the identity of the digital content file may be inferred based on the location of the event or the time that the event is occurring (or occurred), or both. Some digital library terminals may be configured to allow users to view and edit the contents of their personal digital libraries.

Schedule Service

A schedule service may be invocable to generate data relating to a schedule identified in a personal user profile associated with a token identifier received from a schedule terminal. The schedule data may correspond to the associated user's entire schedule or the schedule data may be filtered based upon time context data received from the schedule terminal. For example, the schedule service may generate data relating to one or more items (e.g., the next conference meeting) in the identified schedule occurring at or after the time when a token identifier is read. Some schedule terminals may be configured to allow users to modify their online schedules (e.g., by uploading an updated schedule, or by adding items to or deleting items from the online schedule).

Message Service

A message service may be invocable to access one or more message stores identified in a personal user profile associated with a token received from a message terminal. The message store may be, for example, an e-mail message store or a voice-mail message store. The message store may be accessed with a message address (e.g., an e-mail address) and a URL for the corresponding message server, which may be operated by a third party service provider. In addition to retrieving messages, users also may transmit messages to others through the message service.

Print Service

A print service may be invocable to generate data relating to data that may be printed onto a substrate (e.g., paper) by a print terminal. The generated data may relate to, for example, a schedule, itinerary, or boarding pass (in airport terminal applications) identified in a personal user profile associated with a token received from a print terminal. The data may be collected from third party service providers. For example, the user's schedule may be provided by a third party scheduling service and the user's itinerary may be provided by a third party travel service (e.g., an online travel agent). Alternatively, the generated data may relate to one or more events occurring within the selected locale. For example, the print service may be configured to generate data corresponding to a particular digital content file identified based upon context data (e.g., location or time, or both) that is received from the print terminal. The print service preferably is configured to transmit data to the print terminals in a format that is suitable for printing.

News Service

A news service may be invocable to generate data that relates to newsworthy events occurring within the selected locale and that may be presented to the user at a news terminal. The news data may correspond to news for a preselected period of time (e.g., the current day or the entire period of scheduled event occurring within the selected locale) or the news data may be filtered based upon time context data received from the news terminal (e.g., news items for the remainder of the day following the time when a token identifier is read). The news data also may be personalized based upon preferences identified in a personal user profile that is associated with a token received from a news terminal.

Attendee Service

An attendee service may be invocable to obtain a count of token identifiers read by each terminal. The attendee service also may be operable to store one or more lists of users associated with token identifiers read by the terminals. The attendee service may be used by event organizers or other authorized parties to track users as they visit, for example, sessions, exhibits, labs, or booths.

Payment Service

A payment service may be invocable to extract a payment from an account (e.g., a credit card account or an ATM account) that is specified in a personal user profile associated with a token received from a payment terminal. The payment service preferably is operable to transmit the extracted payment to an account (e.g., a vendor's checking or savings account) that is identifiable by context data that transmitted along with the token from the payment terminal.

Still other kinds of services may be provided.

Figure 4:
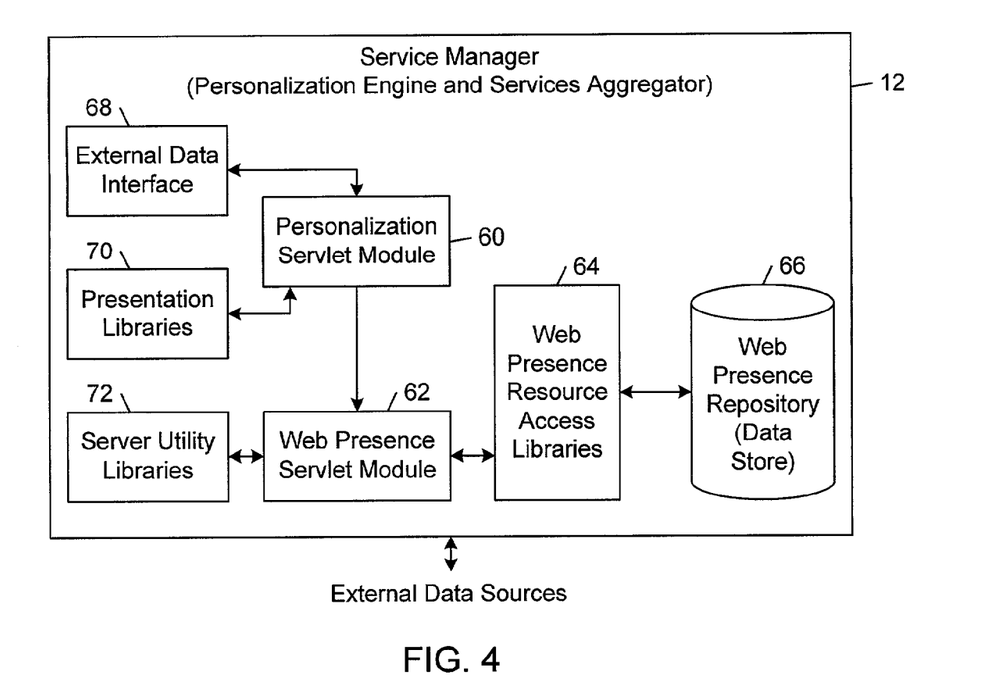
FIG. 4 is a block diagram of a service manager.

Referring to FIG. 4, in one embodiment, service manager 12 is implemented in the form of multiple computer software modules, including a personalization servlet module 60 and a web presence servlet module 62. In some implementations, service manager may be built using the HP Cooltown Web Presence Manager (available from Hewlett-Packard Company of Palo Alto, Calif., U.S.A.). Personalization servlet module 60 is the entry point for any external client terminal to interact with the web presence servlet module 62 and contains business logic for handling requests from and transmitting responses to the client terminals. Web presence servlet module 62 is programmed to create, administer, and build web presence associations. Web presence resource access libraries 64 are used by web presence servlet module 62 to create and manage the web presences in a web presence repository 66. In one implementation, the web presence repository 66 is an XML (extensible markup language) based repository that holds all of the web presences for the system. An external data interface 68 is used by the personalization servlet module 60 to handle different kinds of external client calls, including calls from, for example, e-mail clients and database clients. Presentation libraries 70 provide a set of user interfaces that are used by the personalization servlet module 60 to render proper user interfaces to a client terminal when a request is made. The presentation libraries may be made from a set of conventional user interface building blocks. A server utility libraries module 72 holds software used by both the personalization servlet module 60 and the web presence servlet module 62, as well as the software that enables communication between the personalization servlet module 60 and the web presence servlet module 62.

The implementation of FIG. 4 integrates and interfaces easily and seamlessly with numerous disparate information systems (e.g., registration databases, lead generation systems, and messaging systems).

Figure 5:
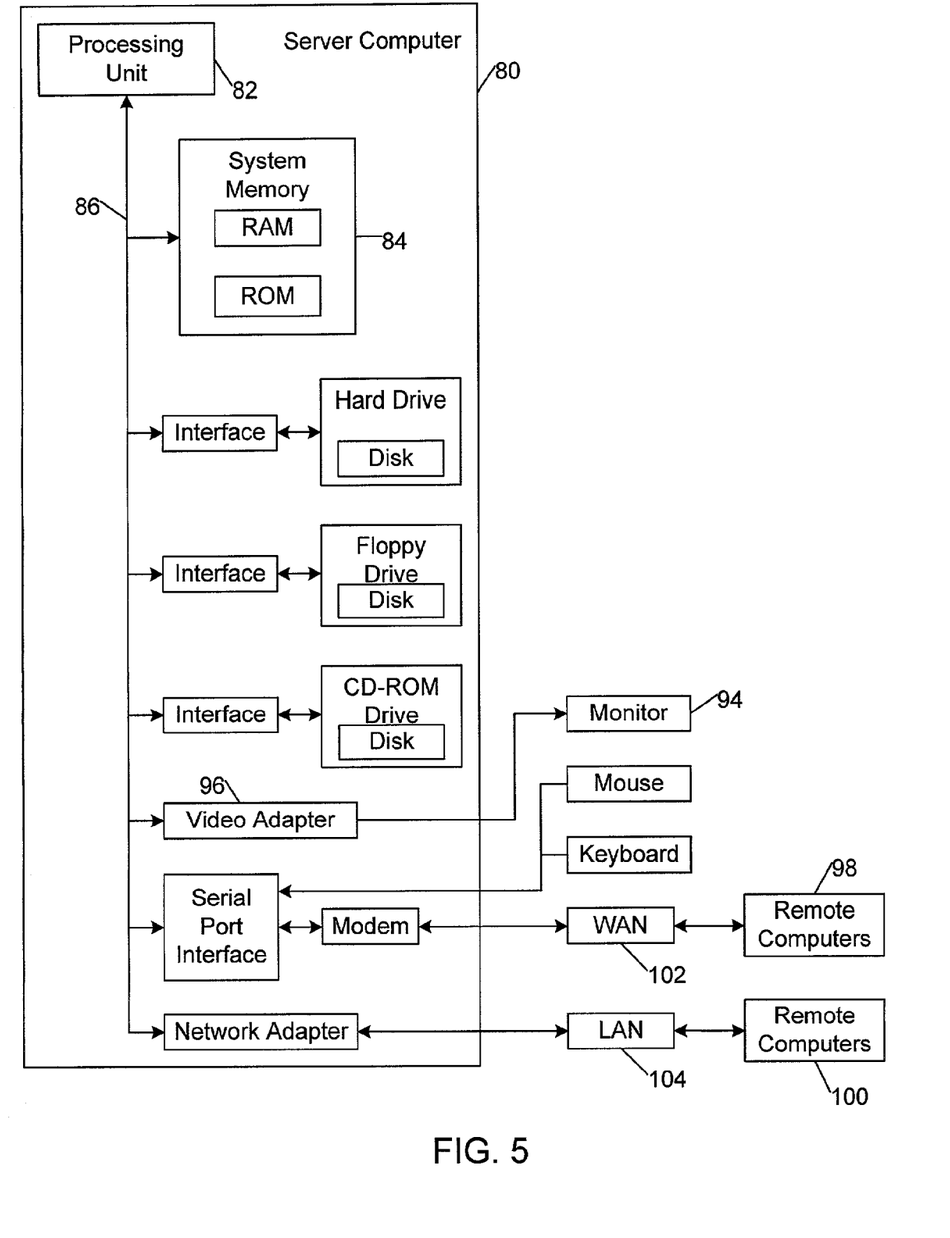
FIG. 5 is a block diagram of a server computer.

Referring to FIG. 5, in one embodiment, content manager 12 may operate on a server computer 80. Server computer 80 includes a processing unit 82, a system memory 84, and a system bus 86 that couples processing unit 82 to the various components of computer 80. Processing unit 82 may include one or more processors, each of which may be in the form of any one of various commercially available processors. System memory 84 may include a read only memory (ROM) that stores a basic input/output system (BIOS) containing start-up routines for computer 80 and a random access memory (RAM). System bus 86 may be a memory bus, a peripheral bus or a local bus, and may be compatible with any of a variety of bus protocols, including PCI, VESA, Microchannel, ISA, and EISA. Computer 80 also includes a persistent storage memory system (e.g., a hard drive, a floppy drive, a CD ROM drive, magnetic tape drives, flash memory devices, and digital video disks) that is connected to system bus 86 and contains one or more computer-readable media disks that provide non-volatile or persistent storage for data, data structures and computer-executable instructions. A user may interact (e.g., enter commands or data) with computer 80 using one or more input devices (e.g., a keyboard, a computer mouse, a microphone, joystick, and touch pad). Information may be presented through a graphical user interface (GUI) that is displayed to the user on a display monitor 94, which is controlled by a video adapter 96. Computer 80 also may include peripheral output devices, such as speakers and a printer. One or more remote computers 98, 100 may be connected to computer 80 over a WAN (wide area network) 102 and over a LAN (local area network) 104, respectively.

Figure 6A:
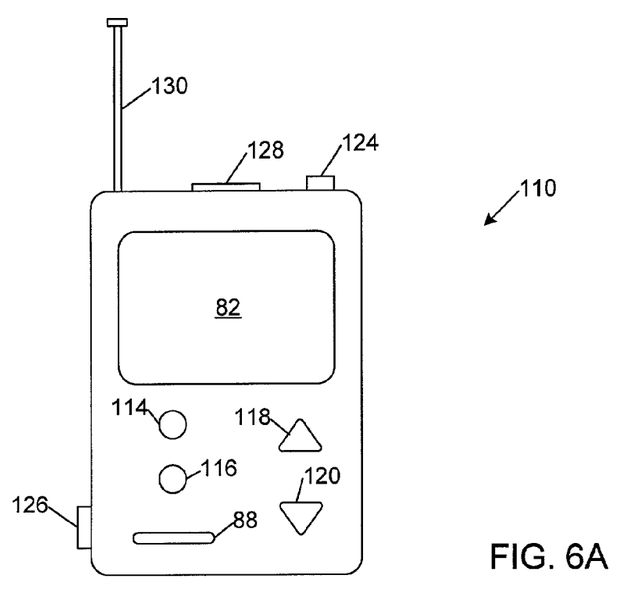
FIG. 6A is diagrammatic front view of a handheld PDA.

Referring to FIG. 6A, in one embodiment, one or more client terminals 14-18 each may be implemented as a handheld PDA 110. Handheld PDA 110 includes a screen 112 that displays a graphical user interface, which may present one or more user options for controlling the operation of handheld PDA 110. Handheld PDA 110 also includes various user controls, including one or more control buttons 114, 116, 118, 120. Handheld PDA 110 has an output port 124 for connecting to an input jack of an audio output device (e.g., headphones), and a cable port 126 for connecting to a computer or other hardware system. Portable media device further includes a wireless communication port 128, for example, an IrDA (Infrared Data Association) port, through which handheld PDA 110 may wirelessly communicate with other similarly configured devices. Some embodiments may include an RF antenna 130 instead of, or in addition to, wireless communication port 128. Each client terminal 14-18 also includes a respective token reader (not shown) and an optional context data generator (e.g., a GPS receiver, a clock, or a thermometer; not shown).

Figure 6B:
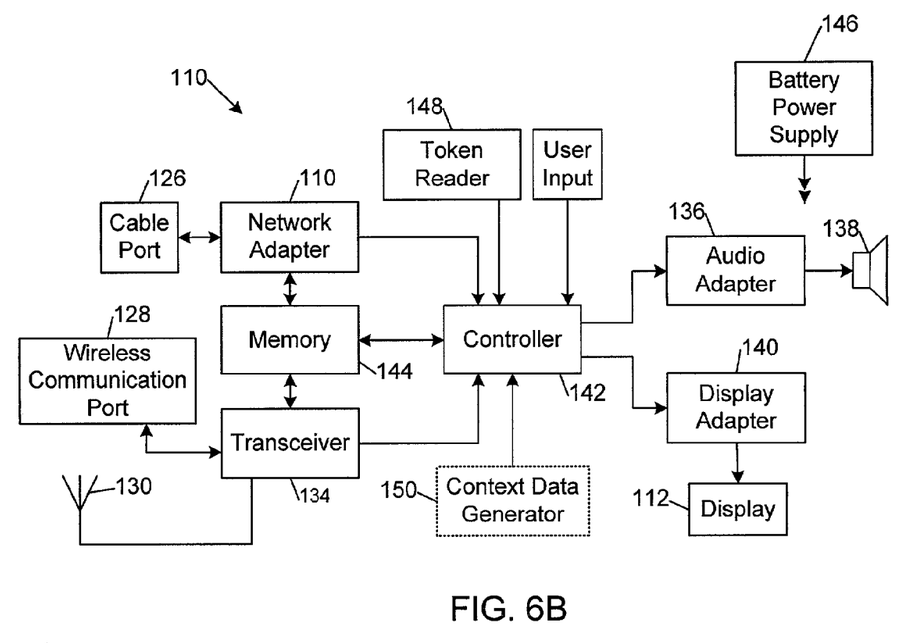
FIG. 6B is a block diagram of components of the handheld PDA of FIG. 6A.

As shown in FIG. 6B, handheld PDA 110 has a communication subsystem that includes a network adapter 132 that is configured to communicate through cable port 126 and a transceiver 134 that is configured to communicate through wireless communication port 128 (or antenna 130). Handheld PDA 110 also may have a digital content rendering subsystem that includes an audio adapter 136 that is configured to transmit digital audio data signals to one or more speakers 138, and a display adapter 140 that is configured to transmit image data signals to display screen 112. A controller 142 is configured to choreograph the operation of handheld PDA 110. Handheld PDA also may have a memory 144 that may include a random access memory (RAM) and a read only memory (ROM). In some embodiments, one or more other storage technologies may be used, including an internal hard drive and a removable storage device (e.g., a removable hard drive, storage card or disk). A battery power supply 146 supplies the electrical power needed to operate handheld PDA 110. Handheld PDA 110 also includes a respective token reader 148 and an optional context data generator 150 (e.g., a GPS receiver, a clock, a thermometer, an accelerometer, or an electronic compass).

In other embodiments, one or more of client terminals 14-18 each may be implemented as a solid state digital audio player, a CD player, an MCD player, a camera, a game pad, a cellular telephone, a cordless telephone, a pager, a desktop computer, a laptop computer, a printer (e.g., an HP LaserJet® printer available from Hewlett-Packard Company of Palo Alto, Calif., U.S.A.), or other electronic device.

In the context of events, such as tradeshows, conferences and conventions, the above identified service delivery embodiments provide numerous advantages for users, partners and exhibitors and organizers, including the following.

These embodiments may personalize the experience for the attendee. For example, these embodiments may deliver personalized content for each attendee. An attendee's badge may become a smart device and a unique identifier throughout the whole event. The badge also may provide a tracking mechanism. An attendee's personal digital library may provide a central electronic repository of all information attendee is interested in. Terminals automatically identify each attendee and provide fast and easy access to material without having to go through a cumbersome log on process. For example, a printer terminal may identify an attendee and immediately discern what the attendee wants to print based simply on the presentation of the attendee's badge.

These embodiments also may provide a better service delivery mechanism for partners and exhibitors. For example, exhibitors may determine who specifically attended their booths with greater accuracy. These embodiments may provide a tracking mechanism of the specific products/services that each attendee is interested in. Partners may be able to readily provide updated information to attendees that are interested in their products/services because this information is electronically available and can be updated on the fly. In some implementations, an attendee may download a partner's product brochures without visiting a booth.

These embodiments also may provide an accurate assessment of attendance for conference givers (or organizers). For example, these embodiments may be configured to automatically and accurately identify the number of attendees at each session, eliminating the need for someone who must be physically present in a session room to count or estimate the number of attendees. These embodiments also may be configured to automatically and accurately identify exactly who attended which presentations, or partner booths. These embodiments may be used to better assess the interests of each attendee for future marketing efforts.

These embodiments also provide a more cost effective and ecologically sound service delivery solution because there is no need to print out the entire proceedings for an event for each attendee. In this way, there is no wasted paper produced either by conference or partner booths. In some implementations in which terminals are implemented as handheld devices (e.g., PDAs or cellular telephones), the service delivery solution may be deployed without physical wiring anywhere in the venue, thus reducing costs.

The systems and methods described herein are not limited to any particular hardware or software configuration, but rather they may be implemented in any computing or processing environment, including in digital electronic circuitry or in computer hardware, firmware, or software. These systems and methods may be implemented, in part, in a computer program product tangibly embodied in a machine-readable storage device for execution by a computer processor. In some embodiments, these systems and methods preferably are implemented in a high level procedural or object oriented programming language; however, the algorithms may be implemented in assembly or machine language, if desired. In any case, the programming language may be a compiled or interpreted language. The methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

What is claimed is:

1. A service delivery system, comprising:
a set of portable physical tokens each comprising a respective token identifier;
a network node comprising a database storing personal user profiles, wherein each of the user profiles is associated with a respective one of the token identifiers;
multiple terminals distributed about a selected locale, each terminal having a reader and an associated controller, wherein in response to each presentation of any of the tokens each of the readers is operable to read the respective token identifier from the presented token and the associated controller is operable to transmit over a respective network connection the read token identifier along with associated context data specifying one or more environmental circumstances attendant the presentation of the respective token to the reader; and
a service manager operable to connect to each of the terminals and the database, wherein in response to receipt of a transmission of a respective one of the token identifiers along with the associated context data from a respective one of the terminals, the service manager invokes one or more services that retrieve from one or more remote sources data selected based at least in part upon the associated context data received with the transmission and stores the retrieved data in association with the personal user profile associated with the token identifier received with the transmission.

2. The system of claim 1, wherein each personal user profile designates one or more authorized services to which an associated user is subscribed.

3. The system of claim 2, wherein for each received token identifier the service manager is operable to invoke only authorized services designated in the associated personal user profile.

4. The system of claim 1, wherein each token comprises an RFID tag and each terminal reader is operable to read token identifiers wirelessly from token RFID tags.

5. The system of claim 4, wherein each terminal reader is operable to read token identifiers automatically from token RFID tags when tokens are presented to a terminal reader.

6. The system of claim 1, wherein one or more terminals are handheld computing devices.

7. The system of claim 1, wherein one or more of the terminals are printers, and the service manager is operable to invoke a print service that transmits the retrieved data to one or more of the printers in a format that is suitable for printing.

8. The system of claim 1, wherein context data comprises one or more of an identifier assigned to a terminal, an indication of a time when a token identifier is read, and an indication of where a terminal is located within the selected locale.

9. The system of claim 1, wherein the service manager is operable to invoke one or more services selected from a digital library service, a schedule service, a message service, a print service, and a news service.

10. The system of claim 1, wherein each of one or more of the terminals is dedicated to provide access to a respective service.

11. The system of claim 10, wherein one or more of the terminals are digital library terminals that are dedicated to provide access to a library service.

12. The system of claim 11, wherein the digital library terminals are operable to transmit to the service manager context data enabling identification of respective digital content files; and the digital library service is invocable to add an identified digital content file to a digital content store associated with a respective one of the token identifiers transmitted with context data identifying the digital content file.

13. The system of claim 12, wherein the context data comprises an identifier assigned to a digital library terminal.

14. The system of claim 12, wherein the context data comprises an indication of where a digital library terminal is located within the selected locale.

15. The system of claim 14, wherein the digital library service is invocable to add to the digital content store a specific one of the digital content files that contains information relating to an event occurring at a location near a respective one of the digital library terminals that transmitted to the service manager data enabling identification of the specific digital content file.

16. The system of claim 12, wherein the context data comprises an indication of a time when a respective one of the token identifiers is read.

17. The system of claim 16, wherein the digital library service is invocable to add to the digital content store a specific one of the digital content files that contains information relating to an event occurring at or near the time when the respective token is read.

18. The system of claim 10, wherein one or more of the terminals are schedule terminals that are dedicated to provide access to a schedule service.

19. The system of claim 18, wherein the schedule service is invocable to generate data relating to a respective one of the schedules identified in a respective one of the personal user profiles associated with a respective one of the token identifiers received from a respective one of the schedule terminals.

20. The system of claim 19, wherein each of the schedule terminals is operable to transmit to the service manager a respective indication of a time when a respective one of the token identifiers is read.

21. The system of claim 20, wherein the schedule service generates data relating to one or more items in the identified schedule occurring at or after the time when a respective one of the token identifiers is read.

22. The system of claim 18, wherein one or more schedule terminals are operable to enable a user to modify a schedule identified in a personal user profile associated with a respective one of the token identifiers contained on a respective one of the tokens that is carried by the user.

23. The system of claim 10, wherein one or more of the terminals are message service terminals that are dedicated to provide access to a message service.

24. The system of claim 23, wherein the message service is invocable to access one or more message stores identified in a respective one of the personal user profiles associated with a respective one of the tokens received from a respective one of the message terminals.

25. The system of claim 24, wherein eat least one of the message stores is identified in a respective one of the personal user profiles by an e-mail address and a URL corresponding to an associated e-mail server.

26. The system of claim 10, wherein one or more of the terminals are print terminals that are dedicated to provide access to a print service.

27. The system of claim 26, wherein each of the print terminals is operable to print data generated by the dedicated print service onto a substrate.

28. The system of claim 26, wherein the print service is invocable to generate data relating to a schedule identified in a respective one of the personal user profiles associated with a respective one of the token identifiers received from a respective one of the print terminals.

29. The system of claim 26, wherein the print service is invocable to generate data relating to one or more events occurring within the selected locale based on receipt of a respective one of the token identifiers and the associated context data.

30. The system of claim 26, wherein the print service is invocable to generate data relating to an itinerary identified in a respective one of the personal user profiles associated with a respective one of the token identifiers received from a respective one of the print terminals.

31. The system of claim 26, wherein the context data comprises an indication of a time when a respective one of the token identifiers is read, and the print service is invocable to generate data relating to one or more items in a schedule identified in a respective one of the personal user profiles associated with a respective one of the token identifiers received from a respective one of the print terminals occurring at or after the time when the respective token identifier is read.

32. The system of claim 26, wherein the context data enables identification of a digital content file, and the print service is invocable to transmit the identified digital content file to a respective one of the print terminals in a format suitable for printing.

33. The system of claim 1, wherein the service manager is operable to invoke an attendee service that determines a respective count of ones of the token identifiers read by each of the terminals.

34. The system of claim 33, wherein the attendee service is invocable to store one or more lists of users associated with token identifiers read by the terminals.

35. The system of claim 1, wherein the selected locale corresponds to a building hosting one or more of a tradeshow, a convention, or a conference.

36. A service delivery method, comprising:
issuing to users, by a service delivery system, respective portable physical tokens each comprising a respective token identifier;
storing personal user profiles in a database on a network node, wherein each of the user profiles is associated with a respective token identifier;
receiving, by a service manager, token identifiers and context data specifying one or more environmental circumstances attendant presentations of respective ones of the tokens to readers in respective terminals distributed about a selected locale through multiple corresponding network connections; and
in response to receipt of a transmission of a respective one of the token identifiers along with the associated context data from a respective one of the terminals,
invoking, by the service manager, one or more services that retrieve from one or more remote sources data selected based at least in part upon the associated context data received from the transmitting terminal with the transmission, and
storing the retrieved data in association with the personal user profile associated with the token identifier received with the transmission.

* * * * *

UNITED STATES PATENT AND TRADEMARK OFFICE
CERTIFICATE OF CORRECTION

PATENT NO. : 8,386,389 B2
APPLICATION NO. : 10/135720
DATED : February 26, 2013
INVENTOR(S) : Wesley Chan et al.

Page 1 of 1

It is certified that error appears in the above-identified patent and that said Letters Patent is hereby corrected as shown below:

In the Claims:

In column 12, line 17, in Claim 25, delete "eat" and insert -- at --, therefor.

Signed and Sealed this
Fourth Day of June, 2013

Teresa Stanek Rea
*Acting Director of the United States Patent and Trademark Office*